United States Patent [19]
Hagiwara et al.

[11] Patent Number: 5,490,573
[45] Date of Patent: Feb. 13, 1996

[54] WINDSHIELD APPARATUS FOR A MOTORCYCLE

[75] Inventors: Shinji Hagiwara; Kouichi Kobayashi; Kouji Shimokawa; Kenichi Nishimoto, all of Saitama, Japan

[73] Assignee: Honda Giken Kogyo Kabushiki Kaisha, Tokyo, Japan

[21] Appl. No.: 310,323

[22] Filed: Sep. 22, 1994

[30] Foreign Application Priority Data

Sep. 22, 1993 [JP] Japan ................................. 5-261652

[51] Int. Cl.⁶ ............................................... B60K 11/00
[52] U.S. Cl. ........................ 180/68.1; 296/208; 180/219
[58] Field of Search ................................. 180/219, 68.1, 180/68.2, 68.3; 296/180.1, 208, 78.1, 91; D12/107, 110

[56] References Cited

U.S. PATENT DOCUMENTS

| | | | |
|---|---|---|---|
| D. 333,641 | 3/1993 | Sakaguchi et al. | D12/110 |
| D. 336,450 | 6/1993 | Tsukui et al. | D12/110 |
| D. 347,411 | 5/1994 | Horii et al. | D12/110 |
| D. 350,919 | 9/1994 | Kishi et al. | D12/110 |

OTHER PUBLICATIONS

Patent Abstracts of Japan, vol. 14, No. 361 (M–1006) (4304) 6 Aug. 1990 & JP–A–02 128 977 (Yamaha Motor Co. Ltd.) 17 May 1990.
Motorrad Magazin, Jan. 1993, Stuttgart, pp. 6–11, G. Wimme, "Ballkleid".

*Primary Examiner*—Margaret A. Focarino
*Assistant Examiner*—Victor E. Johnson

[57] ABSTRACT

A pair of air inlet openings and a pair of air introduction paths are formed in a leftwardly and rightwardly symmetrical relationship on left and right side portions of a windshield. The air introduction paths are each formed as a smooth continuous curved face in a transverse direction, and a body center side curved face of the air introduction path is formed more moderate relative to an outer side curved face. When surface air flows along the surface of the front face flow on the air introduction paths since the body center side curved faces are moderate, exfoliation occurs less likely, and the external air admission efficiency of the air inlet openings is raised.

17 Claims, 7 Drawing Sheets

Prior Art

WINDSHIELD APPARATUS FOR A MOTORCYCLE

BACKGROUND OF THE INVENTION

1. Field of the Invention

This invention relates to a windshield apparatus for a motorcycle wherein a pair of air inlet openings are provided at left and right symmetrical positions of a windshield such that external air is introduced into an intake apparatus for an engine by way of a pair of external air admission pipes from the air inlet openings.

2. Description of Background Art

A windshield apparatus for directing external air to an engine of a motorcycle is already known. A surface of the windshield positioned forwardly of the air inlet openings is formed to include recessed grooves to form air introduction paths to the air inlet openings as shown in Japanese Patent Laid-Open Application No. Heisei 2-128977.

SUMMARY AND OBJECTS OF THE INVENTION

Since the transverse section of the air introduction paths is approximate to a substantially channel-shaped section as indicated by a broken line in FIG. 3B and a wall face a on the body center side varies to be substantially perpendicular, a surface flow W of moving air passing on the air introduction path in the transverse direction is sometimes exfoliated at the portion of the wall face a from the surface of the windshield. Such a phenomenon likely occurs when a cross air is strong such as upon cornering, and as a result, the external air admission efficiency is deteriorated. Thus, it is an object of the present invention to eliminate such a problem as described above and enhance the external air admission efficiency of the air inlet openings.

These and other objects of the present invention are achieved by providing a windshield apparatus for a motorcycle having a windshield which covers over a front portion of a body, and an air cleaner located rearwardly of the windshield and wherein external air is introduced into an intake apparatus for an engine by way of a pair of external air admission pipes from a pair of air inlet openings provided at left and right symmetrical positions of the windshield. The air inlet openings are opened forwardly and a surface of the windshield forwardly of the air inlet openings is formed into a pair of recessed grooves to form a pair of air introduction paths to the air inlet openings. Curved faces in a transverse direction of the air introduction paths are formed into smooth continuous curved faces, and a portion of each of the curved faces adjacent the center of the body is shaped more moderate than another portion of the curved face on the outer side of the body.

When the motorcycle is moving, air flows outwardly from the center side of the body in directions transverse to the air introduction paths. Since the curved faces in the transverse direction of the air introduction paths are formed as smooth continuous curved faces and the portion of each of the continuous curved faces on the center side of the body is made more moderate than the portion on the outer side of the body, the air flows in the air introduction paths in a condition wherein it is not readily exfoliated and enters the air inlet openings. Accordingly, the external air admission efficiency is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
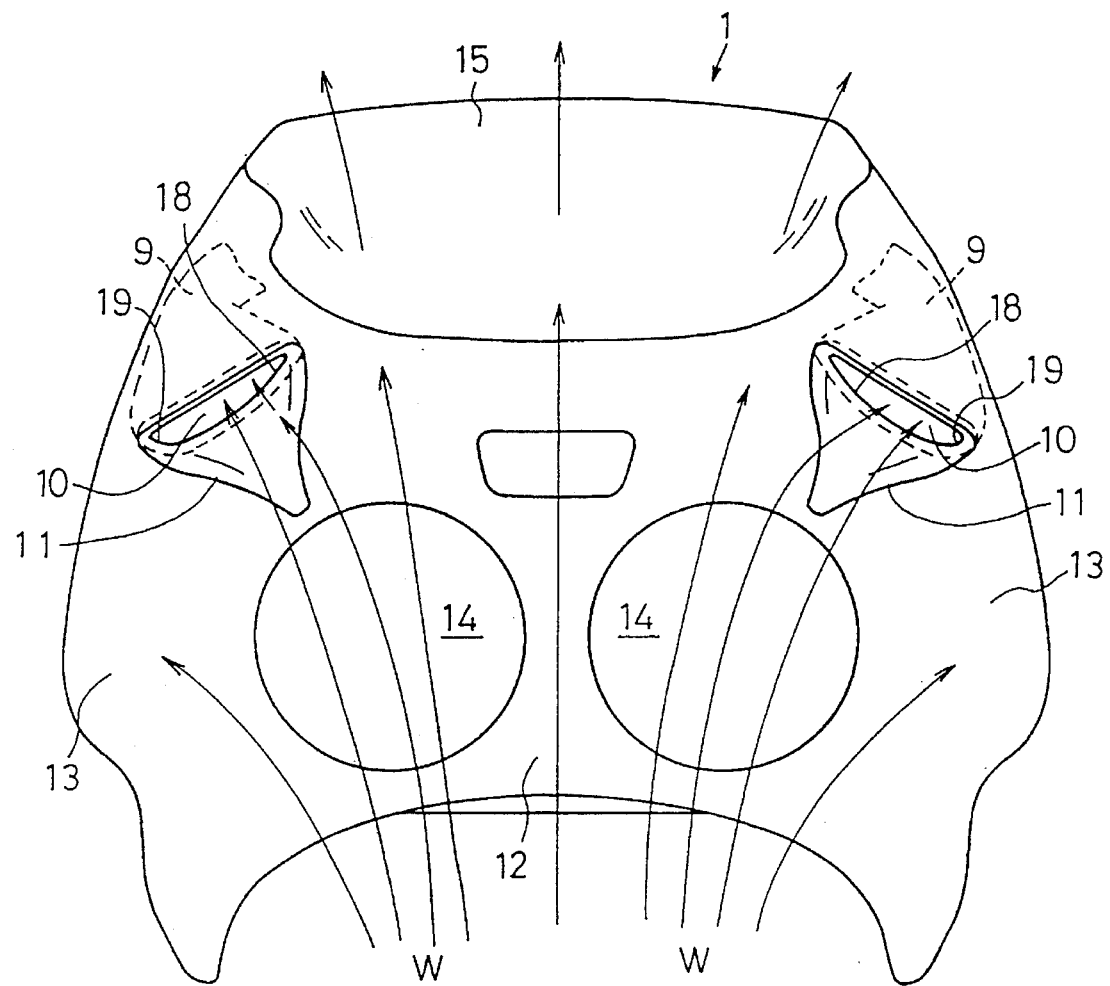
FIG. 1 is a front elevational view of a windshield according to an embodiment of the present invention.

An embodiment will be described with reference to FIGS. 1 to 7. Referring first to FIG. 4, the windshield 1 is mounted such that it covers over a front side of a body continuously from an upper front portion of an inverted type front fork 2 to left and right side portions of a lengthwise four-cylinder V-type engine 3.

The V-type engine 3 is supported below a pair of left and right main frames 4 extending in the lengthwise direction. A throttle body 5 is mounted at a V-bank portion of the V-type engine 3 and external air is supplied from an intake apparatus 6 above the throttle body 5 into the V-type engine 3. As illustrated in FIG. 4, a front wheel 40, a front fender 41, a seat 42, a rear cover 43, a cantilever type rear arm 44, a rear wheel 45 and an exhaust pipe 46 are operatively mounted on the motorcycle frame.

The intake apparatus 6 for the engine is accommodated in a recessed portion provided at a bottom portion of a fuel tank 7 supported on the main frames 4. External air is supplied into the intake apparatus 6 for the engine 3 from an air inlet pipe 8 extending vertically at a front portion of the fuel tank 7. The air inlet pipe 8 is connected to an air inlet opening 10 opened forwardly of the windshield 1 by way of an external air admission pipe 9. The air inlet opening 10 is opened forwardly. An air introduction path 11, in the form of a recessed groove, is formed on a surface of the windshield 1 forwardly of the air inlet opening 10. It is to be noted that the external air admission system structure from the air inlet pipe 8 to the air introduction path 11 is formed leftwardly and rightwardly as a pair as shown in FIGS. 1 and 2.

Figure 2:
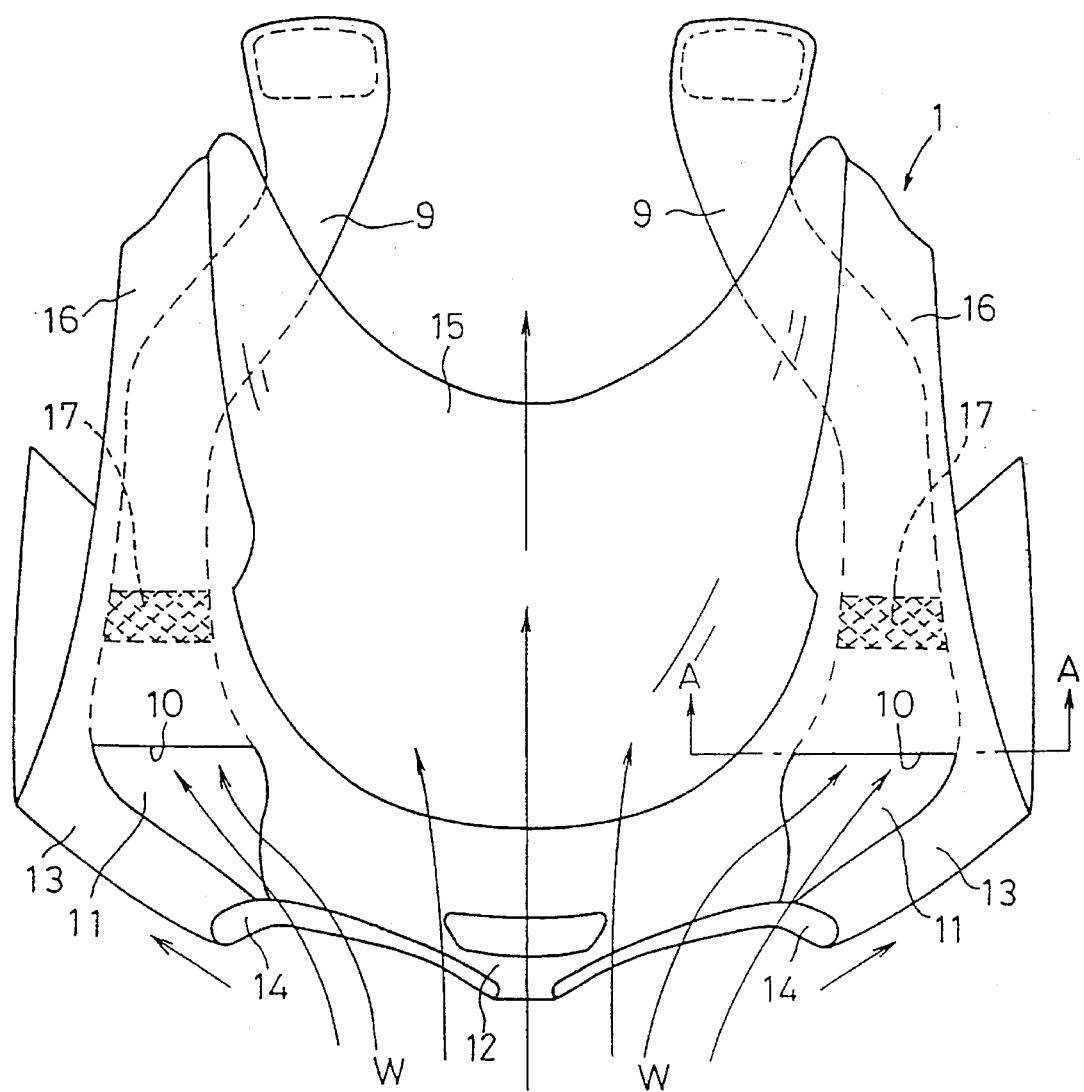
FIG. 2 is a plan view of the windshield according to FIG. 1.

As is apparent from FIGS. 1 and 2, the surface of the windshield 1 is formed as a smooth curved face in order to enhance the air regulation effect. The air inlet openings 10 and the air introduction paths 11 are formed at left and right symmetrical positions on side portions 13 of a front face 12 adjacent openings 14 which are provided for headlights. A screen 15 is mounted at an upper portion of the front face 12 and extends rearwardly. The external air admission pipes 9 extend in the lengthwise direction along and in the proximity of inner sides of a pair of left and right extensions 16 connecting to the screen 15.

The external air admission pipes 9 are formed by a suitable method integrally with or separately from the windshield 1 or in a front and rear divisional type. As illustrated in FIG. 2, if necessary, a filter 17 may be inserted within the air inlet opening 10 and disposed inside of each of the external air admission pipes 9. The permeability or the like of the filters 17 can be selected arbitrarily in order to adjust the external air admission amount into the external air admission pipes.

Figure 3A:
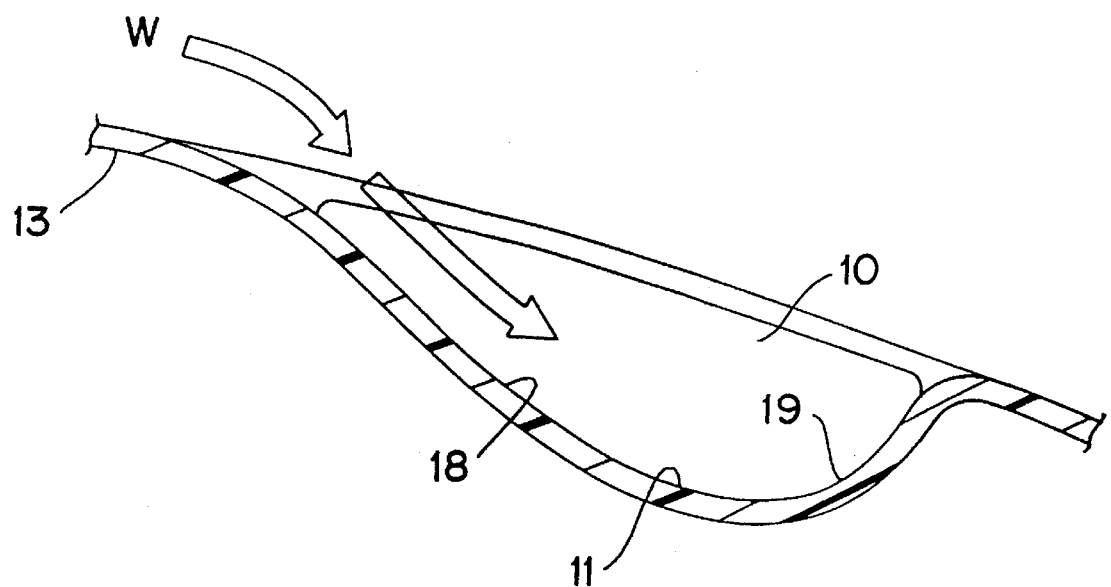
FIG. 3A is an enlarged sectional view taken along line A—A of FIG. 2.
Figure 3B:
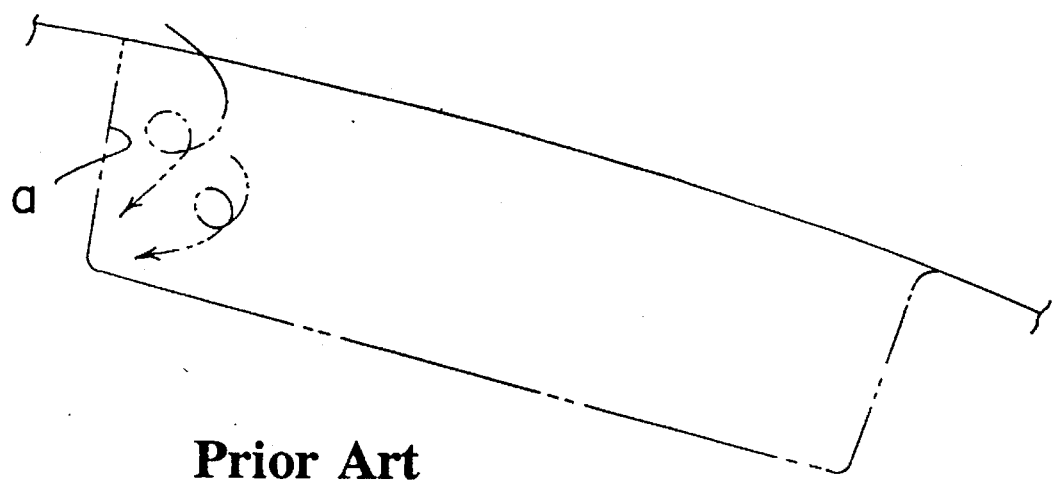
FIG. 3B is an enlarged sectional view of a prior art channel shaped air introduction path.
Figure 4:
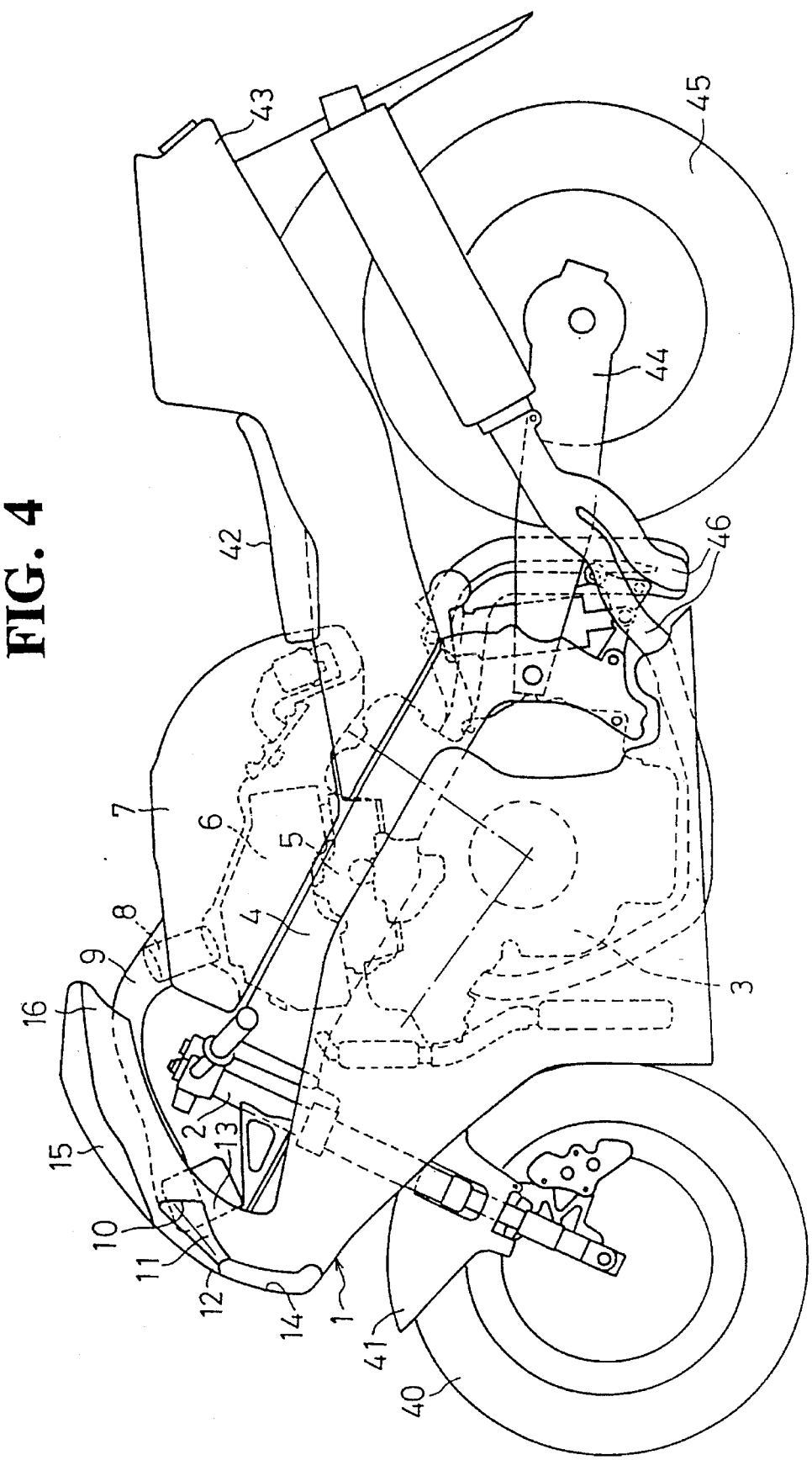
FIG. 4 is a side elevational view of a motorcycle to which the embodiment of the present invention is applied.

As is apparent from FIG. 3A, the air introduction paths 11 are formed in a concave condition on the surfaces of the side portions 13 in smooth continuous curved faces in a transverse direction. The sectional shape of the air introduction paths 11 is approximate to a shape substantially obtained by turning an L-shape. The prior art sectional shape has a substantially channel shape illustrated by the broken line in FIG. 3B. As a result, the shape of the air inlet openings 10 is substantially similar to a triangle.

Of each of the continuous curved faces forming the air introduction paths 11, a body center side curved face 18 is formed more moderately than an outer side curved face 19.

Figure 5:
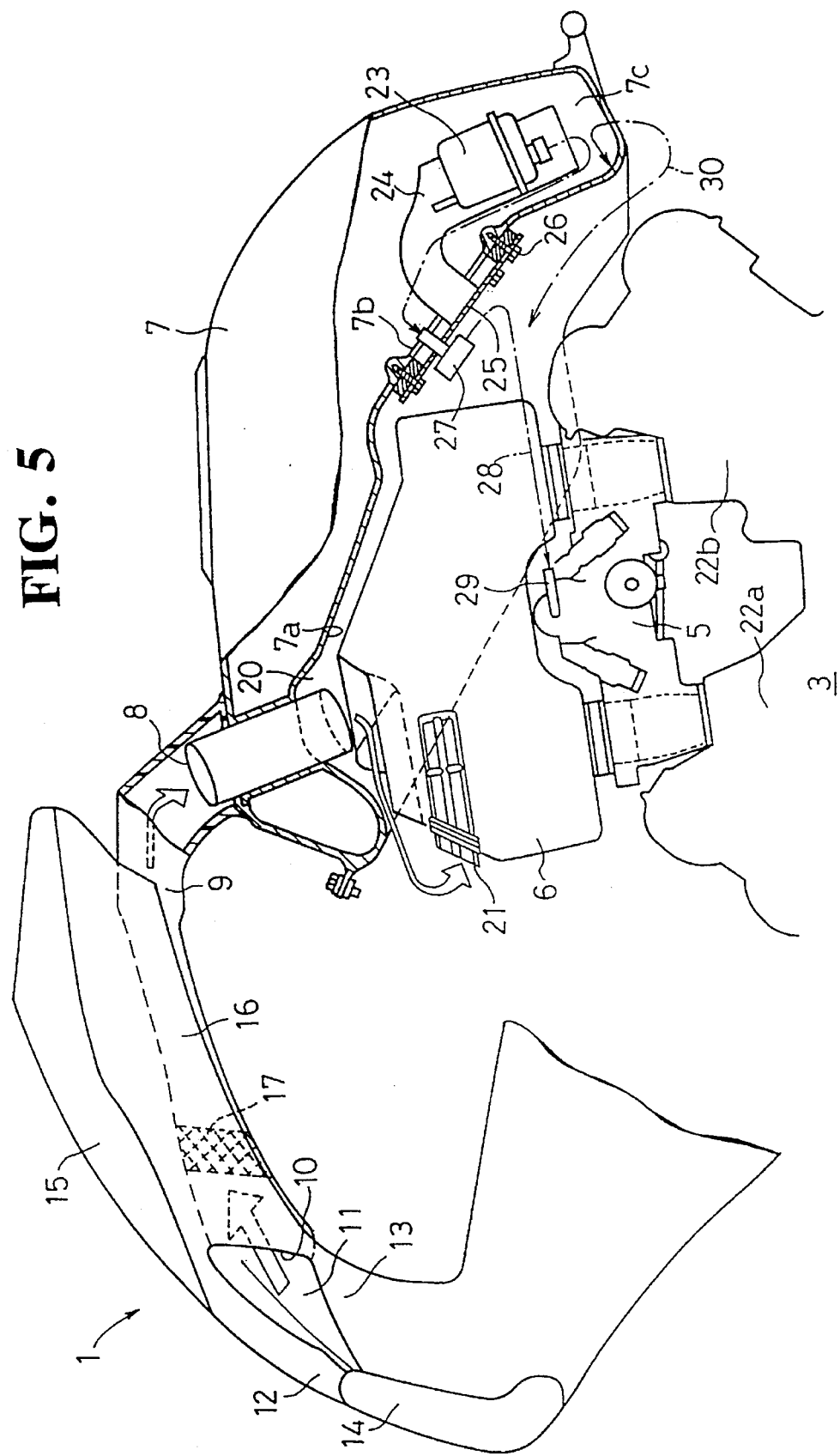
FIG. 5 is a view showing an intake system and a fuel supply system of the embodiment.

FIG. 5 is a view showing an intake system and a fuel system. External air admitted into the external air admission pipes 9 from the air introduction paths 11 through the air inlet openings 10 passes the air inlet pipes 8 and goes out into a space 20 formed below a bottom portion 7a of the fuel tank 7, whereafter it enters the intake apparatus 6 for the engine from an intake duct 21 formed on a front face of the intake apparatus 6 for the engine and provides an fuel air mixture in the throttle body 5 and is then supplied into left and right cylinders of front and rear cylinders 22a and 22b.

A fuel pump 23 is provided at a rear lower portion in the fuel tank 7 and is supported on a base 25 by way of a bracket 24. The base 25 is mounted around an opening 7b by means of bolts 26. Therefore, the fuel pump 23 can be mounted from below the fuel tank.

Fuel force fed from the fuel pump enters a supply nozzle 29 of the throttle body 5 from a joint 27 of the base 25 through a supply side hose 28. Meanwhile, fuel returning from the throttle body 5 is returned into a lowermost chamber 7c of the fuel tank 7 by way of a returning side hose 30.

Figure 6:
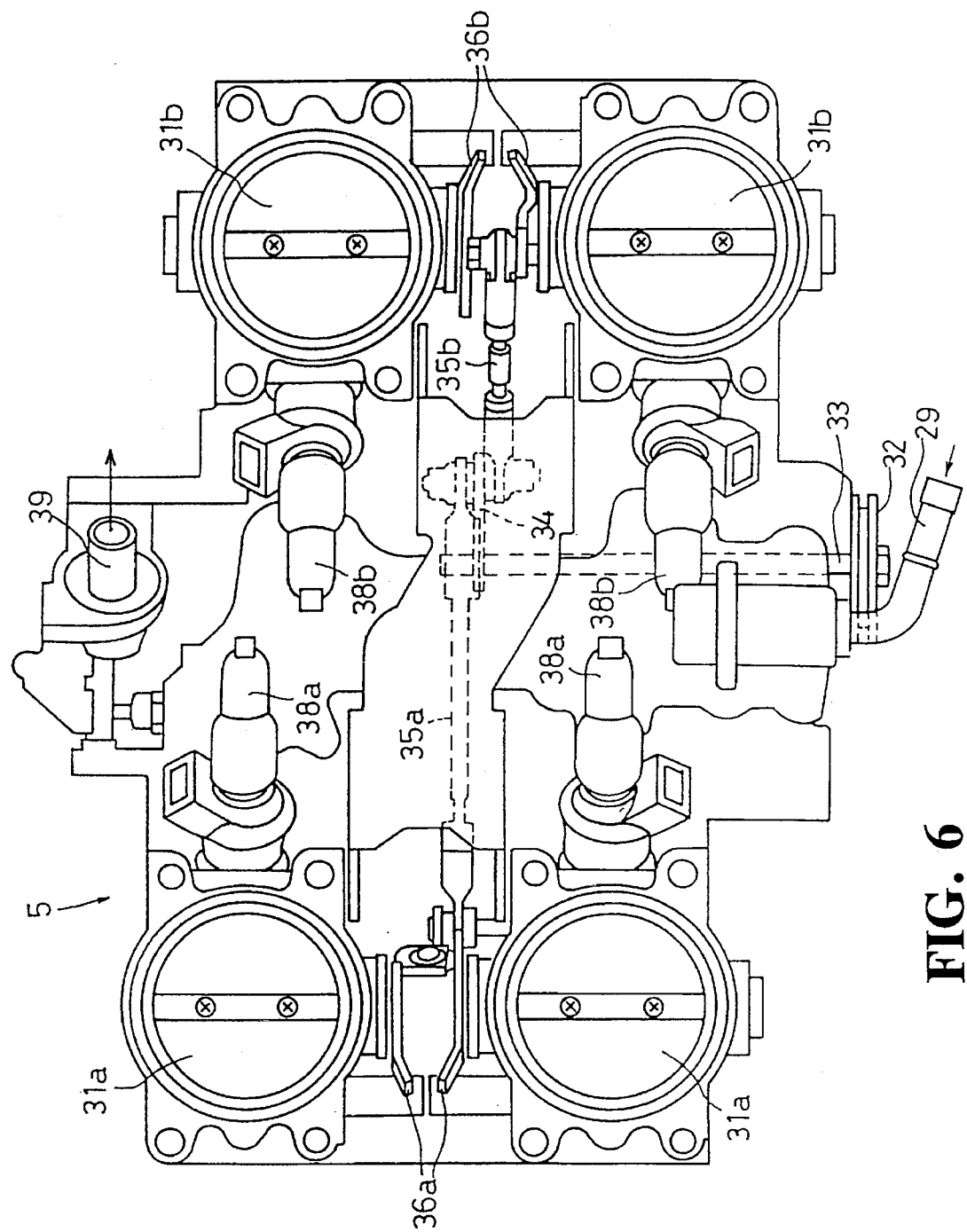
FIG. 6 is a plan view of an essential part of the embodiment.
Figure 7:
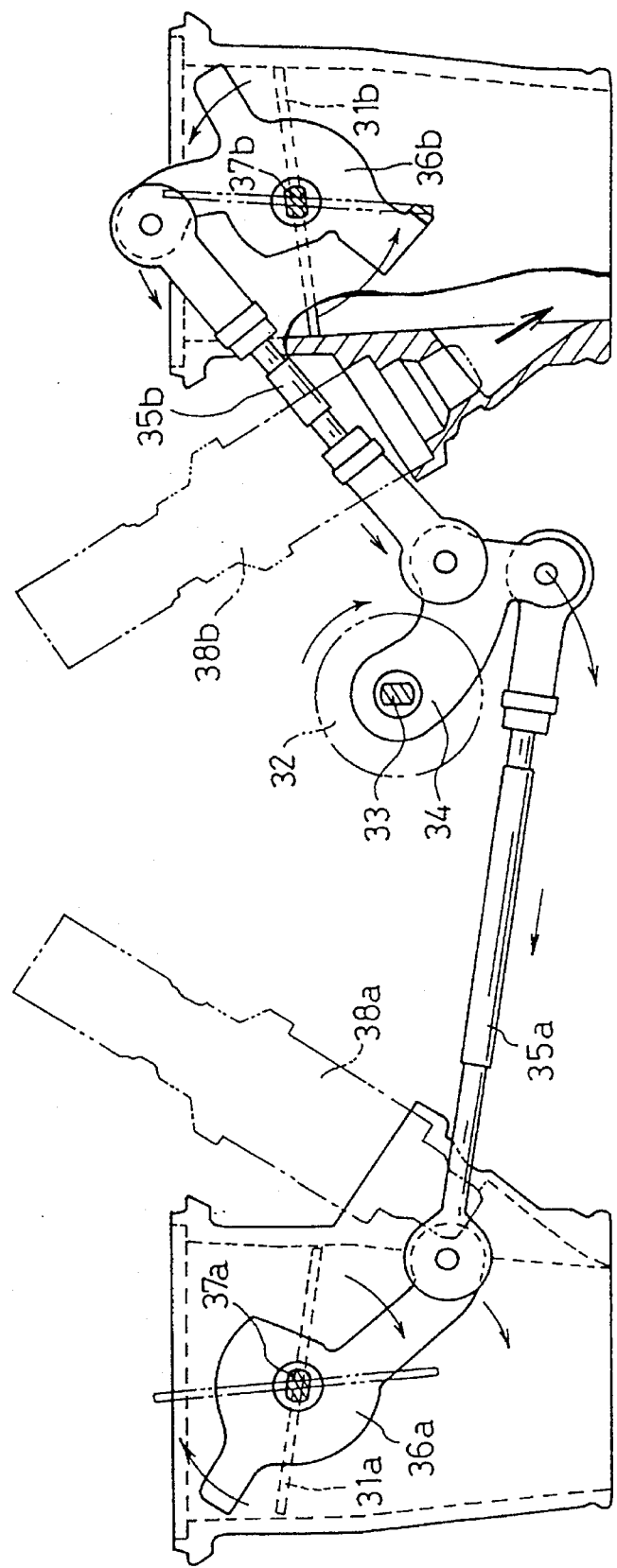
FIG. 7 is a view showing a link system for throttle valves.

FIG. 6 is a view showing the throttle body 5 as viewed from above. FIG. 7 is a view showing a link system for front and rear throttle valves 31a and 31b. As is apparent from FIG. 7, a main plate 34 mounted on a rotary shaft 33 of a drum 32 provided at a central portion of a side face of the throttle body 5 is connected to front and rear follower plates 36a and 36b provided on side faces of individual intake air paths by way of link rods 35a and 35b extending in the lengthwise direction, and the throttle valves 31a and 31b are mounted for integral turning motion on shafts 37a and 37b of the follower plates 36a and 36b, respectively.

The front and rear throttle valves 31a and 31b are opened or closed in symmetrical directions. Portions of the throttle valves 31a and 31b adjacent to fuel injection nozzles 38a and 38b are opened in the downstream direction to facilitate the flow of external air.

As illustrated in FIG. 6, the front and rear intake air paths, the front and rear throttle valve, and the front and rear fuel injection nozzles are provided on each of the left and right sides corresponding to the number of cylinders. Also the front and rear follower plates 36a and 36b are provided adjacent the left and right of the front and rear intake paths, and the left and right front side follower plates 36a operate in an interlocking relationship with a single link rod 35a and the left and right rear side follower plates 36b operate in an interlocking relationship with a single link rod 35b. Consequently, all of the follower plates 36a and 36b are opened or closed at a time in an interlocking relationship with the drum 32. As illustrated in FIG. 7, each of the follower plates 36b includes a tuning adjustment portion. The tuning adjustment can be performed by way of a tuning screw (not shown) mounted on the tuning adjustment portion.

As illustrated in FIG. 6, a fuel returning side nozzle 39 is provided which is connected to the returning side hose 30, as illustrated in FIG. 5.

The operation of the present embodiment is described as follows. First, referring to FIGS. 1 and 3A, surface air flow W flows along the surface of the windshield 1. Even if the surface flow from the central sides of the body in directions transverse to the air introduction paths 11, the surface flow W partially enters the air inlet openings 10 from the air introduction paths 11 since the curved faces in the transverse direction of the air introduction paths 11 form smooth continuous curved faces and the body center side curved faces 18 have a larger radius of curvature than the outer side curved faces 19. The surface flows W readily flow into the air inlet openings 10 without being exfoliated from the surfaces of the body center side curved faces 18.

Consequently, comparing with the prior art, if the opening area is equal, the external air admission efficiency of the air inlet openings 10 is higher by an amount by which exfoliation of the surface flows W is reduced. Besides, external air can be admitted readily even in a running condition wherein cross air is increased such as upon cornering.

Further, by inserting the filters 17 to the locations in the proximity of the air inlet openings 10 in the external air admission pipes 9 and by adjusting the permeability or the like of the filters 17, the air flow rate into the external air admission pipes 9 can be controlled. Therefore, for example, if the air flow rate in the external air admission pipes 9 is adjusted to an optimum degree in advance upon cornering the motion performance can be further enhanced.

According to the present invention, a pair of air inlet openings and a pair of air introduction paths are formed at left and right symmetrical positions of a windshield, and each of the air introduction paths is formed with a smooth continuous curved face in a transverse direction and a curved face of the smooth continuous curved face on the center side of a body is shaped to be more moderate than the other portion on the outer side. Therefore, exfoliation of moving air which passes the air introduction paths is reduced. Where the opening area of the air inlet openings is equal, the external air admission efficiency can be enhanced, but where the introduction rate is fixed, the opening area of the air inlet openings can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ambient air supply for a motorcycle engine comprising:
   a windshield adapted for covering a front portion of a motorcycle body, said windshield having a center portion and outer edge portions;
   at least one air inlet opening provided on said windshield;
   at least one recessed groove being formed in a surface of said windshield forwardly of said at least one air inlet opening providing a substantially longitudinal air introduction path to said at least one air inlet opening, said at least one recessed groove having a smooth, continuously curved surface in a transverse direction of said air introduction path;
   a first portion of said curved surface adjacent the center portion of said windshield being convexly shaped having a first radius of curvature;
   a second convexly shaped portion of the curved surface adjacent one of the outer edge portions of said windshield having a second radius of curvature substantially less than said first radius; and
   an intake conduit being in communication with said at least one air inlet opening for introducing ambient air to the engine.

2. The ambient air supply for a motorcycle engine according to claim 1, wherein said at least one air inlet opening includes a reduced height opening portion positioned adjacent to a center of the windshield which increases in height as the at least one air inlet opening extends outwardly towards one of the outer edge portions of said windshield.

3. The ambient air supply for a motorcycle engine according to claim 1, wherein said at least one recess groove extends a predetermined distance to a first point from said at least one air inlet opening, a width of said at least one recess groove being narrow at said first point and expanding to be equal to a width of said at least one air inlet opening at a point adjacent to said at least one air inlet opening.

4. The ambient air supply for a motorcycle engine according to claim 3, wherein said at least one recess groove extends continuously in a curved surface from said first point to said point adjacent to said at least one air inlet opening.

5. The ambient air supply for a motorcycle engine according to claim 1, and further including an air filter member operatively positioned in said intake conduit.

6. The ambient air supply for a motorcycle engine according to claim 1, wherein said at least one air inlet opening and said at least one recess groove extend at a predetermined angle relative to said center portion of said windshield.

7. An ambient air supply for a motorcycle engine comprising:
   a windshield adapted for covering a front portion of a motorcycle body, said windshield having a center portion and outer edge portions;
   a first air inlet opening provided on a first side of said windshield and a second air inlet opening provided on a second side of said windshield;
   a first recessed groove being formed in a surface of said windshield forwardly of said first air inlet opening providing a first substantially longitudinal air introduction path to said first air inlet opening, said first recessed groove having a smooth, continuously curved surface in a transverse direction of said first air introduction path;
   a second recessed groove being formed in a surface of said windshield forwardly of said second air inlet opening providing a second substantially longitudinal air introduction path to said second air inlet opening, said second recessed groove having a smooth, continuously curved surface in a transverse direction of said second air introduction path;
   a first portion of each of said curved surfaces of said first and second recessed grooves disposed adjacent the center portion of said windshield being convexly shaped having a first radius of curvature;
   a second convexly shaped portion of each of said curved surfaces adjacent a respective one of the outer edge portions of said windshield having a second radius of curvature substantially less than said first radius;
   a first intake conduit being in communication with said first air inlet opening for introducing ambient air to the engine; and
   a second intake conduit being in communication with said second air inlet opening for introducing ambient air to the engine.

8. The ambient air supply for a motorcycle engine according to claim 7, wherein said first and second air inlet openings include a reduced height opening portion positioned adjacent to a center of the windshield which increases in height as the first and second air inlet openings extend outwardly towards one of the outer edge portions of said windshield.

9. The ambient air supply for a motorcycle engine according to claim 7, wherein said first and second recess grooves extend, respectively, a predetermined distance to a first point from said first and second air inlet openings, a width of said first and second recess grooves being narrow at said first point and expanding to be equal to a width of said first and second air inlet openings at a point adjacent to said first and second air inlet openings, respectively.

10. The ambient air supply for a motorcycle engine according to claim 9, wherein said first and second recess grooves extend continuously in a curved surface from said first point to said point adjacent to said at least one air inlet opening.

11. The ambient air supply for a motorcycle engine according to claim 7, and further including an air filter member operatively positioned in each of said first and second intake conduits.

12. The ambient air supply for a motorcycle engine according to claim 7, wherein said first and second air inlet openings and said first and second recess grooves extend at a predetermined angle relative to said center portion of said windshield.

13. A windshield adapted for covering a front portion of a motorcycle body, said windshield having a center portion and outer edge portions comprising:
   at least one air inlet opening provided on said windshield;
   at least one recessed groove being formed in a surface of said windshield forwardly of said at least one air inlet opening providing a substantially longitudinal air introduction path to said at least one air inlet opening, said at least one recessed groove having a smooth, continuously curved surface in a transverse direction of said air introduction path;
   a first portion of said curved surface adjacent the center portion of said windshield being convexly shaped having a first radius of curvature;
   a second convexly shaped portion of the curved surface adjacent one of the outer edge portions of said windshield having a second radius of curvature substantially less than said first radius.

14. The windshield according to claim 13, wherein said at least one air inlet opening includes a reduced height opening portion positioned adjacent to a center of the windshield which increases in height as the at least one air inlet opening extends outwardly towards one of the outer edge portions of said windshield.

15. The windshield according to claim 13, wherein said at least one recess groove extends a predetermined distance to a first point from said at least one air inlet opening, a width of said at least one recess groove being narrow at said first point and expanding to be equal to a width of said at least one air inlet opening at a point adjacent to said at least one air inlet opening.

16. The windshield according to claim 15, wherein said at least one recess groove extends continuously in a curved surface from said first point to said point adjacent to said at least one air inlet opening.

17. The windshield according to claim 13, wherein said at least one air inlet opening and said at least one recess groove extend at a predetermined angle relative to said center portion of said windshield.

* * * * *